United States Patent Office 2,939,822
Patented June 7, 1960

2,939,822

PRODUCTION OF VITAMIN $B_{12}$ USING DELTA-AMINOLEVULINIC ACID

Ian M. Miller, Liberty Corner, and Charles Rosenblum, Princeton, N.J., assignors to Merck & Co., Inc., Rahway, N.J., a corporation of New Jersey No Drawing. Filed Apr. 23, 1957, Ser. No. 654,450

7 Claims. (Cl. 195—96)

This application is a continuation-in-part of our co-pending application Serial No. 600,649, filed July 30, 1956, and now abandoned.

This invention relates to the production of therapeutically and nutritionally valuable substances by fermentation, and in particular to improved nutrient media for the microbiological production of vitamin substances having LLD activity or growth promoting properties for the microorganism *Lactobacillus lactis* Dorner.

According to the present invention, it has been found that the vitamin $B_{12}$-producing microorganisms utilize delta-aminolevulinic acid preferentially to carbon and nitrogen from other sources. This indicates that delta-aminolevulinic acid is a precursor in the synthesis of vitamin $B_{12}$, and that the production is facilitated by the addition of delta-aminolevulinic acid.

The culture medium for the conversion, according to the present invention, includes, in addition to delta-aminolevulinic acid, the usual nutrients, which include sources of carbon, nitrogen, inorganic salts, and growth factors when required. The carbon may be provided by a carbohydrate, such as dextrose, maltose, xylose, invert sugar, corn syrup, beet molasses, and the like. The nitrogen can be provided by an ammonium salt, amino acids or proteins, such as soybeans, oats, yeast, yeast extracts, tryptic digest of casein, meat extract, blood meal, protein meal, and bone scrap, salmon meal, fish meal, fish solubles, distillers' solubles, and the like. If desired, the microorganism may be propagated using proteins or amino acids without any carbohydrate being present in the medium, in which case the proteins or amino acids may serve as a source of both the carbon and the nitrogen required by the microorganism. The addition of cobalt in any suitable form is customary to obtain high yields.

The delta-aminolevulinic acid which is added to the culture medium, according to the present invention, is added in comparatively small amounts. Because delta-aminolevulinic acid is somewhat unstable under fermentation conditions, it should be added at intervals of, say about once every two days, rather than in a single portion at the start of fermentation. The concentration of delta-aminolevulinic acid in the culture medium should be kept within the range of about 0.001 to 1.0 percent by weight of the medium by periodic addition. For example, a total of 25 milligrams of delta-aminolevulinic acid may be added to a 50-milliliter culture medium in two equal portions, one at the start of fermentation and the other two days later. In that case, delta-aminolevulinic acid will be present throughout fermentations lasting up to four days. The maximum concentration during this period will be about 0.025 percent by weight or slightly greater.

The culture medium is sterilized and the sterile medium containing the desired amount of cobalt is inoculated with a culture of vitamin $B_{12}$-producing microorganisms, and the mixture is incubated until the optimum LLD activity is obtained. Any of the vitamin $B_{12}$-producing microorganisms, such as *Pseudomonas denitrificans*, *Pseudomonas lumichroma*, *Pseudomonas mucidolens*, *Streptomyces griseus*, *Streptomyces olivaceus*, *Bacillus megatherium*, and *Propionibacterium freudenreichii* are suitable for fermentation according to this invention. Particularly good results are obtained with members of the genus Pseudomonas, especially *Pseudomonas denitrificans*.

The fermentation is ordinarily conducted for a period of two to seven days, although shorter or longer times may be employed if desired. The incubation is usually carried out under submerged conditions and at an appropriate temperature, which may be in the range of about 25° to 37° C. A particularly advantageous temperature for fermentation has been found to be 28° C.

The culture medium may be sterilized prior to the addition of delta-aminolevulinic acid by any of the conventional sterilization means, such as autoclaving at an elevated temperature, preferably about 120° C. and 15 pounds per square inch steam pressure. Other means of sterilization, such as the use of a microbiological sterilization filter, may be used. The use of means other than heat is essential for the sterilization of delta-aminolevulinic acid, as that substance is decomposed by heat. A preferred method of sterilizing delta-aminolevulinic acid is the use of microbiological sterilization filter.

Vitamin $B_{12}$ may be isolated from the fermentation medium either as a crystalline product or as an active constituent of an LLD active concentrate. Various procedures, as for example those described in U.S. patents, No. 2,563,794, issued August 7, 1951, and Nos. 2,703,302 and 2,703,303, issued March 1, 1955, may be used.

The following example is given for the purpose of illustration:

*Example*

An aqueous fermentation medium was prepared having the following composition:

| | Percent |
|---|---|
| L-glutamic acid | 1.0 |
| Sucrose | 3.0 |
| $(NH_4)_2HPO_4$ | 0.2 |
| KCl | 0.08 |
| $MgSO_4 \cdot 7H_2O$ | 0.05 |
| $MnSO_4 \cdot 4H_2O$ | 0.02 |
| $FeSO_4 \cdot 7H_2O$ | 0.002 |
| $ZnSO_4 \cdot 7H_2O$ | 0.002 |
| $Co(NO_3)_2 \cdot 6H_2O$ | 0.004 |
| Betaine | 1.0 |
| Delta-aminolevulinic acid hydrochloride | 0.05 |

The medium was prepared by combining all of the ingredients except the delta-aminolevulinic acid hydrochloride. The pH of the solution was adjusted to within the range of 7.0 to 7.2. Five 50-milliliter quantities of the medium were each placed in 250-milliliter Erlenmeyer flasks. The flasks were then sterilized by autoclaving at 15 p.s.i. steam pressure (121° C.) for 15 minutes. Thereafter 12.5 milligrams of delta-aminolevulinic acid dissolved in 5 milliliters of water which had been sterilized by filtration through a porcelain microbiological filter were also added to each flask. Radioactive delta-aminolevulinic acid, having radioactive $C^{14}$ atoms at the 1 and 4 positions, was used. The radio-activity of the delta-aminolevulinic acid was 619,000 counts per minute per milligram of carbon, as measured by a windowless Geiger counter. Each flask was then inoculated with 0.5 milliliter of a one-day culture of *Pseudomonas denitrificans* grown at 28° C. on a medium having the following composition:

|  | Percent |
|---|---|
| L-glutamic acid | 1.0 |
| Sucrose | 3.0 |
| $(NH_4)_2HPO_4$ | 0.2 |
| KCl | 0.08 |
| $MgSO_4 \cdot 7H_2O$ | 0.05 |
| $MnSO_4 \cdot 4H_2O$ | 0.02 |
| $FeSO_4 \cdot 7H_2O$ | 0.002 |
| $ZnSO_4 \cdot 7H_2O$ | 0.002 |
| $Co(NO_3)_2 \cdot 6H_2O$ | 0.004 | pH 7 to 7.2

After inoculation, the broths were shaken continuously on a rotary shaker for four days at 28° C. An additional sterile portion of 12.5 milligrams of delta-aminolevulinic acid hydrochloride in 5 milliliters of water was added aseptically to each flask 48 hours after inoculation. The total delta-aminolevulinic acid hydrochloride added to each flask was thus 25 milligrams. After completion of the fermentation period, the activities of the broths were determined by a cup-plate method in which the amount of LLD active material was determined by the growth response of *Lactobacillus lactis* Dorner. The fermentation broths were prepared for the assay by adjusting the pH to 5 with hydrochloric acid, and adding sodium cyanide to give a concentration of 0.01 percent. The acidified samples were heated to approximately 100° C. for 30 minutes by placing them in free-flowing steam in an autoclave. The samples were then cooled and diluted with 0.05 M $KH_2PO_4$—$K_2HPO_4$ buffer at pH 5 to give a dilution containing about 0.2 microgram of vitamin $B_{12}$ per milliliter.

A total of 163 micrograms of vitamin $B_{12}$ was produced in the five flasks as determined by LLD assay. This corresponds to an average of 32.6 micrograms vitamin $B_{12}$ yield in each flask. The specific radioactivity of carbon in the vitamin $B_{12}$ which was isolated was found to be 108,000 counts per minute per milligram. The specific activity of the total broth carbon was found to be 7,170 counts per minute per milligram, which amounts to only 1/15 of the activity of vitamin $B_{12}$. Furthermore, the specific activity of the carbon in the vitamin $B_{12}$ was one-fifth as great as that of the carbon in the delta-aminolevulinic acid.

The high activity of the vitamin $B_{12}$ carbon, compared with the low average activity of the broth carbon, together with the relatively small difference between the specific activities of the carbon in delta-aminolevulinic acid and in the vitamin $B_{12}$ produced, indicates that the microorganisms utilized the delta-aminolevulinic acid in preference to the other substances in the nutrient medium for the biosynthesis of vitamin $B_{12}$ and therefore is a useful material as an additive to broths for producing fermentation media for the production of vitamin $B_{12}$.

While the above example has been given for purposes of illustration, other microorganisms can be used with the same results. For example, *Pseudomonas lumichroma*, *Pseudomonas mucidolens*, *Streptomyces griseus*, *Bacillus megatherium*, and *Propionibacterium freudenreichii* are also capable of utilizing delta-aminolevulinic acid as a precursor in the synthesis of vitamin $B_{12}$, and any of these microorganisms can be used in place of *Pseudomonas denitrificans* for the product of vitamin $B_{12}$ in a culture medium and under conditions particularly suited to the growth of the microorganism.

Variations from the above-described procedures may be made without departing from the scope of the present invention, which is measured by the scope of the claims.

What is claimed is:

1. The process for producing vitamin $B_{12}$ which comprises growing a vitamin $B_{12}$-producing microorganism in a nutrient medium containing delta-aminolevulinic acid.

2. The process for producing vitamin $B_{12}$ which comprises growing a microorganism of the genus Pseudomonas in a nutrient medium containing delta-aminolevulinic acid.

3. The process for producing vitamin $B_{12}$ which comprises growing *Pseudomonas denitrificans* in a nutrient medium containing delta-aminolevulinic acid.

4. The process for producing vitamin $B_{12}$ which comprises growing a vitamin $B_{12}$-producing microorganism in a nutrient medium containing 0.001% to 1% by weight of delta-aminolevulinic acid.

5. The process for producing vitamin $B_{12}$ which comprises growing a microorganism of the genus Pseudomonas in a nutrient medium containing 0.001% to 1% by weight of delta-aminolevulinic acid.

6. The process for producing vitamin $B_{12}$ which comprises growing *Pseudomonas denitrificans* in a nutrient medium containing 0.001% to 1% by weight of delta-aminolevulinic acid.

7. A nutrient medium for the growth of a vitamin $B_{12}$-producing microorganism, said medium being a nutritionally adequate medium comprising sources of carbon, nitrogen, and cobalt and 0.001% to 1% by weight of delta-aminolevulinic acid.

References Cited in the file of this patent

Dulaney et al.: "Mycologid," No. 3, May–June 1953, pp. 345 to 357.